US010385766B2

(12) United States Patent
Reyes et al.

(10) Patent No.: US 10,385,766 B2
(45) Date of Patent: Aug. 20, 2019

(54) ADJUSTMENT RING ASSEMBLY FOR VARIABLE TURBINE GEOMETRY TURBOCHARGERS

(71) Applicant: BorgWarner Inc., Auburn Hills, MI (US)

(72) Inventors: Jair Reyes, Spartanburg, SC (US); Rajendra Vemula, Arden, NC (US); Guenther Guth, Fankenthal (DE)

(73) Assignee: BorgWarner Inc., Auburn Hills, MI (US)

( * ) Notice: Subject to any disclaimer, the term of this patent is extended or adjusted under 35 U.S.C. 154(b) by 264 days.

(21) Appl. No.: 15/325,183

(22) PCT Filed: Jul. 7, 2015

(86) PCT No.: PCT/US2015/039285
§ 371 (c)(1),
(2) Date: Jan. 10, 2017

(87) PCT Pub. No.: WO2016/010764
PCT Pub. Date: Jan. 21, 2016

(65) Prior Publication Data
US 2017/0159555 A1 Jun. 8, 2017

Related U.S. Application Data

(60) Provisional application No. 62/025,254, filed on Jul. 16, 2014.

(51) Int. Cl.
F02B 37/24 (2006.01)
F01D 17/16 (2006.01)
F02C 6/12 (2006.01)

(52) U.S. Cl.
CPC .......... F02B 37/24 (2013.01); F01D 17/165 (2013.01); F02C 6/12 (2013.01); F05D 2220/40 (2013.01);
(Continued)

(58) Field of Classification Search
CPC .......... F02B 37/04; F01D 17/165; F02C 6/12; F05D 2200/40; F05D 2230/51; F05D 2230/52; F05D 2300/506; F02D 2250/90
(Continued)

(56) References Cited

U.S. PATENT DOCUMENTS

2013/0004298 A1* 1/2013 Ramb ................... F01D 17/165
415/148
2015/0322849 A1* 11/2015 Ward ...................... F02B 37/24
60/605.1

FOREIGN PATENT DOCUMENTS

CN 1969109 A 5/2007
CN 101384796 A 3/2009
(Continued)

OTHER PUBLICATIONS

International Search Report and Written Opinion; dated Oct. 15, 2015; for International Application No. PCT/US2015/039285; 10 pages.
(Continued)

Primary Examiner — Mahmoud Gimie
(74) Attorney, Agent, or Firm — BrooksGroup

(57) ABSTRACT

An adjustment ring (50) is configured to facilitate vane (30) position adjustment in a variable turbine geometry turbocharger (1), and is formed of an assembly of one or more first ring portions (60) that are formed of a first material, and one or more second ring portions (61) that are formed of a second material. The first material has different material properties than the second material. In some embodiments, high-wear portions of the adjustment ring (50) can selectively and cost-effectively be formed of wear-resistant material while remaining portions are formed of a conventional material. A cost-effective method of manufacturing multi-piece adjustment rings (50) is described.

11 Claims, 6 Drawing Sheets

(52) U.S. Cl.
CPC ...... *F05D 2230/51* (2013.01); *F05D 2230/52* (2013.01); *F05D 2250/90* (2013.01); *F05D 2300/506* (2013.01); *Y02T 10/144* (2013.01)

(58) Field of Classification Search
USPC ...................................................... 415/152.2
See application file for complete search history.

(56) References Cited

FOREIGN PATENT DOCUMENTS

| DE | 102010006852 A1 | 8/2010 |
|---|---|---|
| JP | 2002361460 A | 12/2002 |
| JP | 2011021576 A | 2/2011 |
| JP | 2012052520 A | 3/2012 |
| JP | 2012149612 A | 8/2012 |
| JP | 2012158993 A | 8/2012 |
| JP | 2012163083 A | 8/2012 |
| JP | 2013501631 A | 1/2013 |
| JP | 2014034910 A | 2/2014 |
| WO | 2014024905 A1 | 2/2014 |
| WO | 2014208734 A1 | 12/2014 |

OTHER PUBLICATIONS

Chinese Office Action dated Feb. 2, 2018 ; Application No. 201580037100.4; Applicant: BorgWarner Inc.; 11 pages.
Japanese Office Action dated Dec. 14, 2018 ; Application No. 2017-501662; Applicant: BorgWarner Inc.; 9 pages.

\* cited by examiner

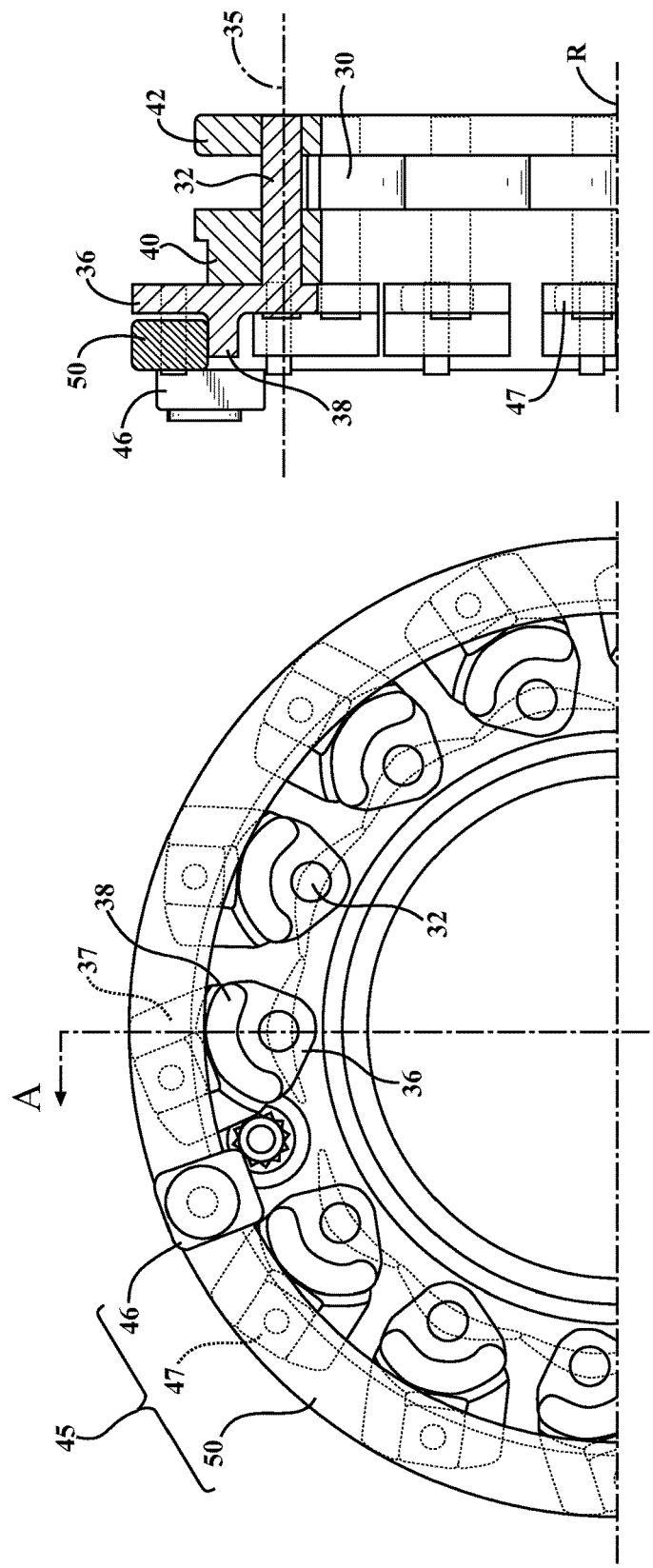

ADJUSTMENT RING ASSEMBLY FOR VARIABLE TURBINE GEOMETRY TURBOCHARGERS

CROSS-REFERENCE TO RELATED APPLICATION

This application claims priority to and all the benefits of U.S. Provisional Application No. 62/025,254, filed on Jul. 16, 2014, and entitled "Adjustment Ring Assembly For Variable Turbine Geometry Turbochargers."

FIELD OF THE INVENTION

Embodiments are generally related to turbochargers and, more particularly, to an improved adjustment ring for variable turbine geometry turbochargers.

BACKGROUND

Exhaust gas turbochargers are provided on an engine to deliver air to the engine intake at a greater density than would be possible in a normal aspirated configuration. This allows more fuel to be combusted, thus boosting the engine's horsepower without significantly increasing engine weight.

Generally, an exhaust gas turbocharger includes a turbine section and a compressor section, and uses the exhaust flow from the engine exhaust manifold to drive a turbine wheel located in the turbine section. The turbine wheel drives a compressor wheel located in the compressor section via a shaft that extends between the sections. Air compressed by the compressor section is then provided to the engine intake as described above.

In some turbochargers, the turbine section may have variable turbine geometry (VTG) that permits adjustment of the amount of exhaust gas directed to the turbine wheel. In some examples, the VTG is implemented using a ring of aerodynamically shaped vanes that are disposed in the turbine housing at the inlet to the turbine wheel. The vanes rotate in unison to vary the inlet area and angle of approach of the exhaust gas directed to the turbine wheel. By altering the turbine housing geometry in this way, the turbocharger has reduced lag and increased efficiency at higher speeds. Moreover, the exhaust gas backpressure and the turbocharger speed can be controlled by modulating the exhaust gas flow to the turbine wheel via the VTG.

SUMMARY

In some aspects, an adjustment ring is configured to facilitate vane position adjustment in a variable turbine geometry turbocharger. The adjustment ring includes a first ring portion that is formed of a first material; and a second ring portion that is formed of a second material. The first ring portion and the second ring portion are configured to be assembled together into a single annular element, and the first material has different material properties than the second material.

The adjustment ring may include one or more of the following additional features: The first material is a different material than the second material. The first material has been subjected to a different heat treatment than the second material. The first material has a higher wear resistance than the second material. The first ring portion corresponds to a portion of the single annular element that, when in use, is subjected to the highest wear. The first ring portion is fixed to the second ring portion. The first ring portion includes a first ring mating edge having an irregular profile, the second ring portion includes a second ring mating edge having an irregular profile, and the irregular profile of the first ring mating edge is configured to matingly engage the irregular profile of the second ring mating edge.

In some aspects, a method of manufacturing an annular adjustment ring is provided. The annular adjustment ring is configured to facilitate vane position adjustment in a variable turbine geometry turbocharger. The method includes providing a cutting pattern for the adjustment ring, the cutting pattern incorporating sector patterns, and each sector pattern corresponds to a ring portion of the adjustment ring. The sector patterns are arranged within the cutting pattern such that the sector patterns are nested. The method further includes cutting a first sheet of source material in accordance with the cutting pattern to provide ring portions; and assembling the ring portions together to form at least one annular adjustment ring.

The method may include one or more of the following steps and/or features: The step of cutting comprises fine blanking. The step of cutting includes cutting at least one individual ring portion from a second sheet of source material, where the second sheet of source material has different material properties than the first sheet of source material. The first sheet of source material has different wear resistance than the second sheet of source material. The step of assembling the ring portions comprises assembling at least one ring portion formed from the first sheet of source material with at least one ring portion formed from a second sheet of source material to form the annular adjustment ring, the second sheet of source material having different material properties than the first sheet of source material. The second sheet of source material is less wear resistant than the first sheet of source material, and when the ring portions are assembled together to form the adjustment ring, the first ring portion is arranged within the adjustment ring at a location that corresponds to a portion of the adjustment ring that, when in use, is subjected to the highest wear.

The adjustment ring assembly of the variable turbine geometry (VTG) turbocharger is an important part of the overall VTG since it is the link between the vane ring assembly, which supports the vanes, and the adjustment shaft, which connects the VTG to an actuator. In particular, the adjustment ring assembly is used to control the position of the vanes relative to the turbine housing. As such, it plays a critical role in the structure and function of the VTG assembly, and can affect turbocharger efficiency. Several components, such as the adjustment ring, pivoted sliding blocks and large adjustment block, form the adjustment ring assembly.

In some aspects, the adjustment ring assembly includes a multi-piece adjustment ring that provides increased wear resistance, and reduced weight and manufacturing costs relative to some conventional single-piece adjustment rings. In particular, by manufacturing the adjustment ring in two, three, four or more individual pieces, and then assembling the individual pieces into the single adjustment ring, one or more of the pieces can be formed of a material different than that of the remaining pieces. For example, one piece can be made of a highly-wear resistant, and thus relatively expensive, material and incorporated into the assembly at a location requiring high wear resistance, whereas the remaining piece(s) can be made of a conventional, and thus relatively inexpensive, material. This approach reduces costs of manufacturing a wear resistant adjustment ring, and can be compared to some conventional adjustment rings which are stamped as a single piece from a sheet of material.

In this example, the individual pieces used to form the adjustment ring are generated by splitting a template adjustment ring into two or more pieces at strategic locations. This provides the benefit of permitting the designer to hand pick and combine relatively expensive materials with less expensive materials. By this technique, a relatively expensive wear resistant piece can be provided for use in the higher wear region of the adjustment ring, where the location of such a high wear region is determined based on historical experience and wear calculation estimations. In this technique, less wear resistant, and thus less expensive, materials and pieces can be used in non-critical locations. This can be compared to a conventional adjustment ring that, when entirely formed of the highly wear resistant material, is much more expensive than the multi-piece adjustment ring in which highly wear resistant material is only used at locations of high wear.

Moreover, by manufacturing the adjustment ring in multiple pieces, more pieces can be cut from single source sheet of material due to use of strategic cutting patterns, further reducing manufacturing costs. In some embodiments, the strategic cutting patterns employ a nested arrangement of the pieces to be cut. This can be compared to some conventional adjustment rings which are cut as a single piece from a sheet of material. Due to their annular shape, manufacture of such a conventional adjustment rings results in large amounts of wasted material relative to the manufacture of the multi-piece adjustment ring, due to wasted material corresponding to the center region and to poor packing density associated with its circular outer shape.

Advantageously, multiple adjustment rings can be stamped from the same sheet of source material, significantly reducing material wastage and scrap during manufacturing, and particularly with respect to fine blanking. In some embodiments, three or four adjustment rings having similar diameters and can be fine blanked in multiple pieces out of the same area of sheet metal required for fine blanking a single, unitary adjustment ring of the same diameter.

BRIEF DESCRIPTION OF THE DRAWINGS

FIG. 2 is a compressor-side view of the adjustment ring assembly.

FIG. 3 is a cross-sectional view of the adjustment ring assembly as seen along line A-A of FIG. 2.

DETAILED DESCRIPTION OF THE INVENTION

Figure 1:
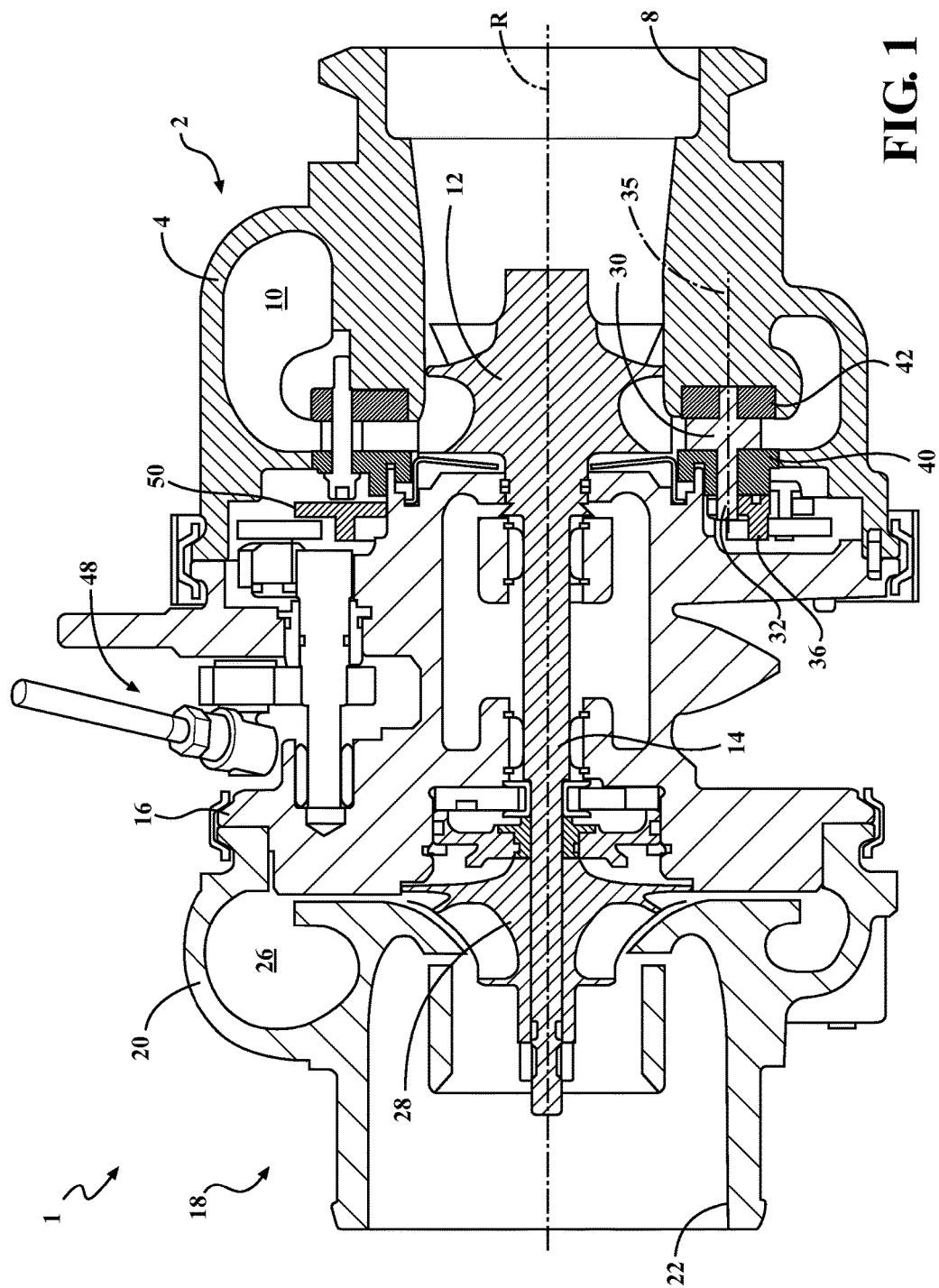
FIG. 1 is a cross-sectional view of a variable turbine geometry turbocharger.

Referring to FIG. 1, an exhaust gas turbocharger 1 includes a turbine section 2, the compressor section 18, and a center bearing housing 16 disposed between and connecting the compressor section 18 to the turbine section 2. The turbine section 2 includes a turbine housing 4 that defines an exhaust gas inlet (not shown), an exhaust gas outlet 8, and a turbine volute 10 disposed in the fluid path between the exhaust gas inlet and the exhaust gas outlet 8. A turbine wheel 12 is disposed in the turbine housing 4 between the turbine volute 10 and the exhaust gas outlet 8. A shaft 14 is connected to the turbine wheel 12, is supported for rotation about a rotational axis R within in the bearing housing 16, and extends into the compressor section 18. The compressor section 18 includes a compressor housing 20 that defines an axially-extending air inlet 22, an air outlet (not shown), and a compressor volute 26. A compressor wheel 28 is disposed in the compressor housing 20 between the air inlet 22 and the compressor volute 26, and is connected to the shaft 14.

In use, the turbine wheel 12 in the turbine housing 4 is rotatably driven by an inflow of exhaust gas supplied from the exhaust manifold of an engine (not shown). Since the shaft 14 connects the turbine wheel 12 to the compressor wheel 28 in the compressor housing 20, the rotation of the turbine wheel 12 causes rotation of the compressor wheel 28. As the compressor wheel 28 rotates, it increases the air mass flow rate, airflow density and air pressure delivered to the engine's cylinders via an outflow from the compressor air outlet, which is connected to the engine's air intake manifold.

The turbocharger 1 is a variable turbine geometry turbocharger (VTG). In particular, the turbine section 2 includes a plurality of pivotable vanes 30 to control the flow of exhaust gas that impinges on the turbine wheel 12 and control the power of the turbine section 2. The vanes 30 also therefore control the pressure ratio generated by the compressor section 18. In engines that control the production of NOx by the use of High Pressure Exhaust Gas Recirculation (HP EGR) techniques, the vanes 30 also provide a means for controlling and generating exhaust back pressure.

Referring also to FIGS. 2-3, the vanes 30 are arranged in a circular array around the turbine wheel 12, and are located between the turbine volute 10 and the turbine wheel 12. The vanes 30 are pivotably supported in this configuration between a generally annular upper vane ring 40 and a generally annular lower vane ring 42, where "upper" refers to being closer to the center bearing housing 16, and "lower" refers to being closer to the turbine housing 4. Each vane 30 rotates on a post 32 that protrudes from the opposed side faces of the vane 30, with the post 32 defining a pivot axis 35. The free ends of the post 32 are received in respective apertures in the upper vane ring 40 and the lower vane ring 42. The angular orientation of the upper vane ring 40 relative to the lower vane ring 42 is set such that the corresponding apertures in the vane rings 40, 42 are concentric with the axis 35 of the posts 32, and the vane 30 is free to rotate about the axis 35. On the upper vane ring-side of the vane 30, the post 32 protrudes through corresponding aperture of the upper vane ring 40 and is affixed to a vane arm 36, which controls the rotational position of the vane 30 with respect to the vane rings 40, 42. An adjustment ring assembly 45 is arranged adjacent to, and in parallel with, the upper vane ring 40, and controls the position of all of the vane arms 36 in unison.

The adjustment ring assembly 45 includes the adjustment ring 50, small slide blocks 47 rotatably disposed on the turbine-facing side of the adjustment ring 50, and a large block 46 that is rotatably disposed on the compressor-facing side the adjustment ring 50 and is used to connect the adjustment ring 50 to an actuator. In use, the adjustment ring assembly 45 rotatably drives the vanes 30 via the vane arms 36, which link the adjustment ring assembly 45 to the individual vanes 30. In many configurations, forks 37 formed on the ends of the vane arms 36 drive the independently rotatable slide blocks 47 to minimize friction in the system and to accommodate distortion and corrosion in the turbine housing, and thus the linkages. The adjusting ring 50 is allowed to rotate circumferentially with minimal friction, and is aligned radially so that it remains concentric with the upper and lower vane rings 40, 42, and axially so that the slide blocks 47 remain in contact with the vane arms 36.

In some embodiments the adjustment ring 50 is supported by ramparts 38 on the vane arms 36. The large block 46 is connected by a shaft to the adjusting ring 50. Circumferential motion of the large block 46 about the turbocharger rotational axis R causes the adjusting ring 50 to rotate about the turbocharger rotational axis R. Rotation of the adjusting ring 50 about the turbocharger rotational axis R causes the multiple small slide blocks 47 to rotate about the turbocharger rotational axis R while each of the slide blocks 47 also rotate about the rotational axis 35 of the vane posts 32. This motion of the slide blocks 47 causes the vane arms 36 to rotate about the rotational axis 35 of the vane posts 32 and change the angle of attack of the vanes 30 relative to the exhaust flow. The slide blocks 47 are designed so that the interface between each slide block 47 and the corresponding fork 37 is predominantly sliding friction over the entire area of one cheek of the rotating block. This design provides uniform load distribution, which reduces wear and provides greater life than in line contact, but conversely raises friction over that of a line contact design.

The adjustment ring 50 is controlled by an actuator (not shown) which is operatively connected to the large block 46 via a linkage 48 (FIG. 1), whereby the adjustment ring 50 can rotated about the rotational axis R. The actuator receives commands from the engine electronic control unit (ECU).

Figure 4:
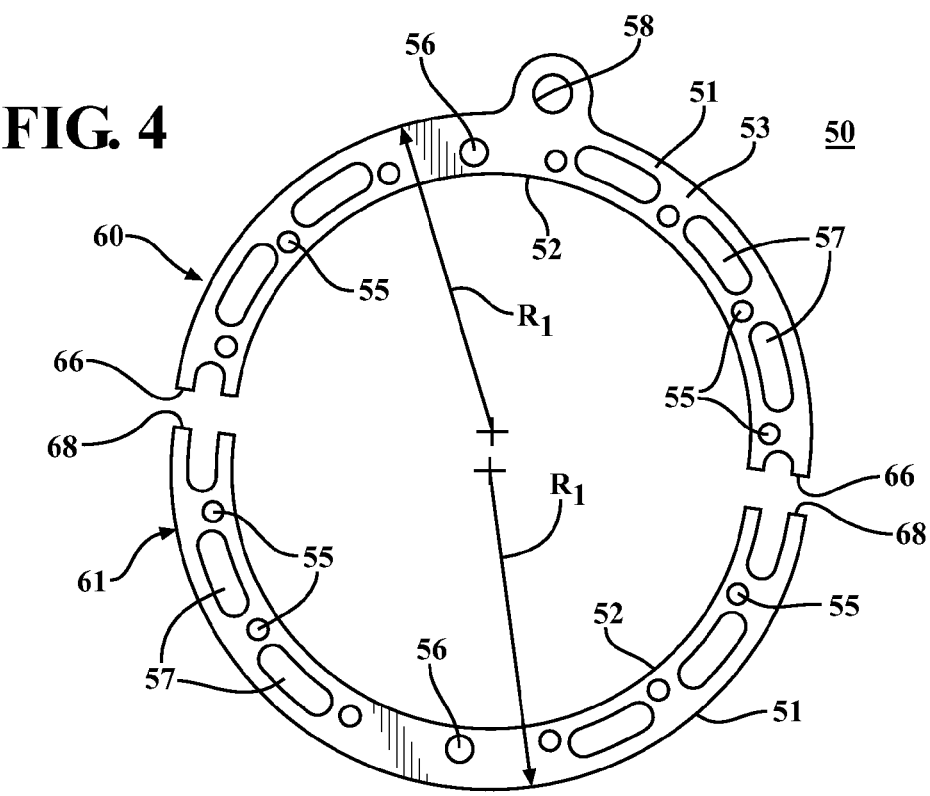
FIG. 4 is a plan view of the ring portions of a two-piece adjustment ring.

Referring to FIG. 4, the adjustment ring 50 is annular in shape, and includes an outer edge 51, an inner edge 52, and opposed side faces 53, 54 (opposite side face 53, but not shown) that extend between the outer and inner edges 51, 52. The adjustment ring 50 is formed having three sets of through-openings 55, 56, 57 that extend between the opposed side faces 53, 54 (opposite side face 53, but not shown). The first set of through-openings consists of circular arm openings 55, each of which is configured to receive one of the vane arms 36. In the illustrated embodiment, there are thirteen arm openings 55 that are generally equidistantly spaced about the circumference of the adjustment ring 50, and are radially located closer to the inner edge 52 than the outer edge 51. The second set of through-openings consist of circular bolt openings 56, each of which is configured to receive a bolt 59 that supports a spacer (not shown) used to control axial spacing between the adjustment ring 50 and the upper vane ring 40. Three bolt openings 56 are equidistantly spaced about the circumference of the adjustment ring 50, and are radially located closer to the inner edge 52 than the outer edge 51. The third set of through-openings consists of weight reduction openings 57 that are disposed between pairs of adjacent arm openings 55. The weight reduction openings 57 are elongated along the circumferential direction, and are radially located midway between the inner edge 52 and the outer edge 51. In addition to the three sets of through-openings 55, 56, 57, the adjustment ring 50 includes a circular securement opening 58 that extends between the opposed side faces 53, 54, and is configured to receive the shaft that secures the large block 46 to the adjustment ring 50, whereby the adjustment ring 50 is connected to the actuator.

The adjustment ring 50 is an assembly of two pieces, including a first ring portion 60 and second ring portion 61. The first ring portion 60 and the second ring portion 61 each have a peripheral shape which is an annular sector. In addition, the first ring portion 60 and the second ring portion 61 each have the same radius of curvature R1, and an arc length generally corresponding to an angle measure of the sector that is about 180 degrees, so that when assembled together, the first ring portion 60 and the second ring portion 61 form a single, complete annular element. Respective mating edges 66 of first ring portion 60 are secured to the corresponding mating edges 68 of the second ring portion 61 by conventional techniques such as welding, riveting (i.e., orbital riveting), etc.

Figure 5:
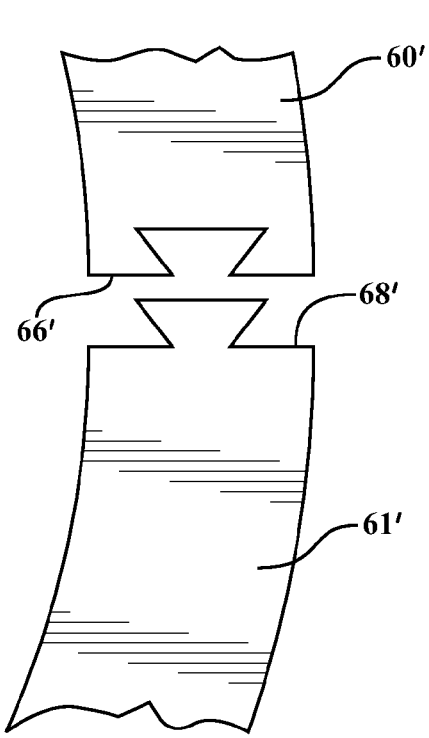
FIG. 5 is a plan view of a portion of the adjustment ring illustrating an exemplary connection configuration.
Figure 6:
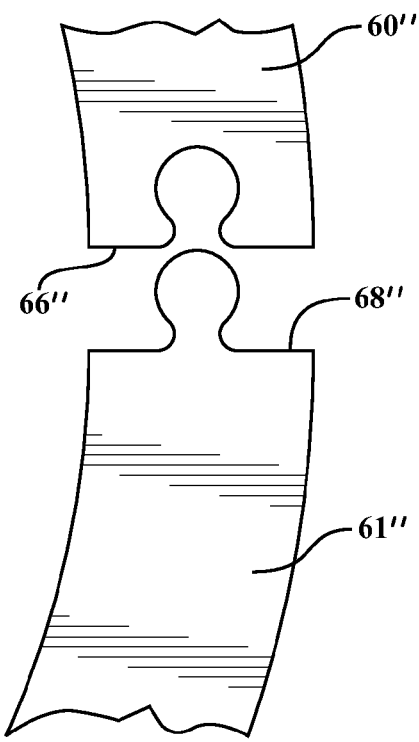
FIG. 6 is a plan view of a portion of the adjustment ring illustrating an alternative exemplary connection configuration.

Referring to FIGS. 5 and 6, in some embodiments, in order to provide a precise and reliable connection between respective ring portions 60', 61', 60", 61", the mating edges 66', 68', 66", 68" have an irregular, interlocking profile. For example, the first ring portion 60', 60" may include a first ring mating edge 66', 66" having an irregular profile including a slot, notch, groove or hole. In addition, the second ring portion 61', 61" may include a second ring mating edge 68', 68" having an irregular profile including a protrusion that is shaped and dimensioned to matingly engage with the profile of the first ring mating edge 66', 66". A press-fit dovetail joint or other mortise-and-tenon connection is an example of such an irregular, interlocking profile that can be used to form a secure assembly of the ring portions 60', 61', 60", 61".

Figure 8:
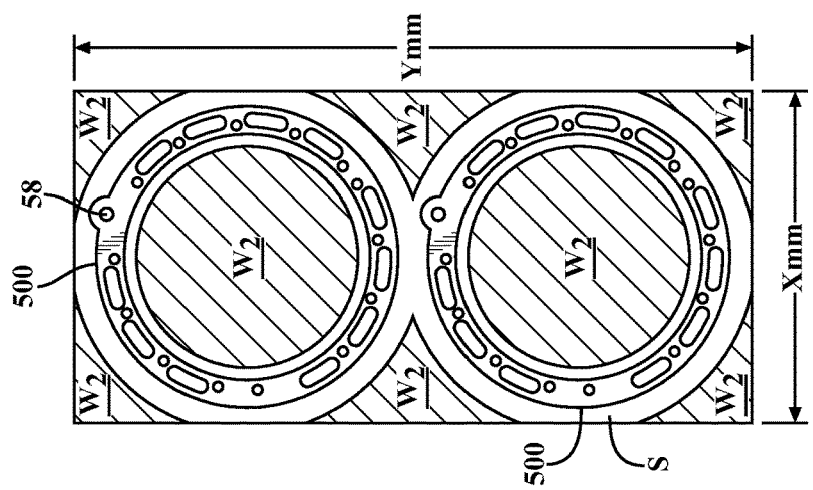
FIG. 8 is an illustration of a conventional cutting pattern for providing single-piece adjustment rings.
Figure 7:
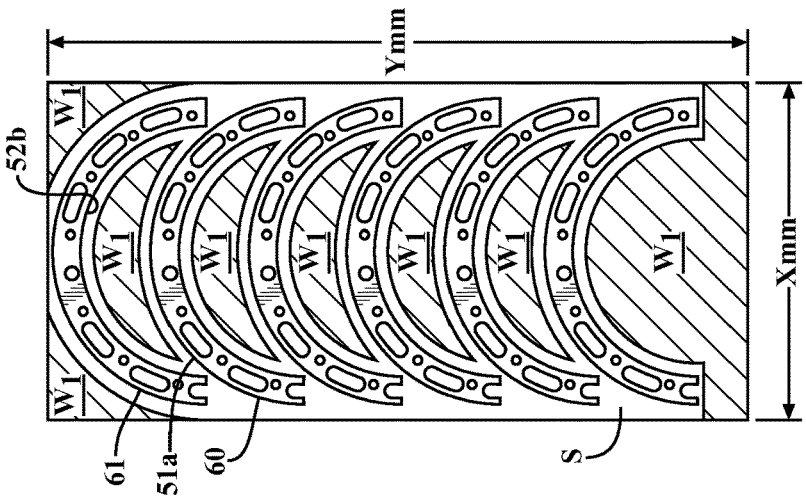
FIG. 7 is an illustration of a cutting pattern for providing ring portions of two-piece adjustment rings, each ring portion having the same radius.

Referring to FIGS. 7 and 8, by forming the adjustment ring 50 in multiple pieces, in this case two ring portions 60, 61, and then assembling the ring portions 60, 61 together to form the single, annular element, material costs are reduced. This is because the ring portions 60, 61 are cut, for example by fine stamping, from a single sheet S of source material. The source material may be, for example, a sheet metal suitable for use in high temperature applications, such as 321 stainless steel. Due to their curved shape and hemispherical arc length, the cutting patterns corresponding to the annular-sector shaped first and second ring portions 60, 61 can be nested (FIG. 7). That is, the convex outer edge 51a of one ring portion 60 can be arranged within the concave inner edge 52b of another ring portion 61 during the cutting process. In one example, for a sheet S of source material having a length of x mm and a height of y mm, by using a nested arrangement during stamped cutting of multiple first and second ring portions 60, 61 from the sheet S of source material, four adjustment rings 50 of radius R1 (as shown in FIG. 4) can be obtained, with minimal waste material W1. This can be compared to stamping single-piece annular adjustment rings 500 from the same sheet S of source material, in which only two adjustment rings 500 can be obtained, and in which the amount of resulting waste material W2 of the sheet S (FIG. 8) is much greater than the waste material W1.

Figure 9:
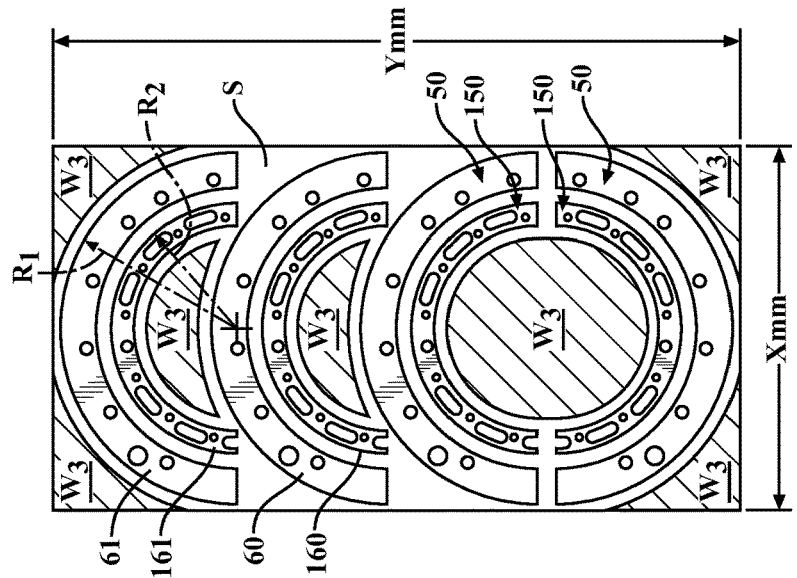
FIG. 9 is an illustration of a cutting pattern for providing ring portions of two-piece adjustment rings, the ring portions having various radii.

Referring to FIG. 9 further reductions in waste material can be gained by stamping adjustment rings 50, 150 of dissimilar diameter from the same sheet S of source material. For example, the stamps corresponding to the annular-sector shaped first and second ring portions 60, 61 corresponding to a first adjustment ring 50 having a radius R1 can be nested. In addition, other stamps corresponding annular-sector shaped third and fourth ring portions 160, 161 corresponding to a second adjustment ring 150 having a radius R2 can be further nested within the stamps for the first and second ring portions 60, 61. In this example, by using a nested arrangement during stamped cutting of the first through fourth ring portions 60, 61, 160, 161 from the sheet S of source material, two adjustment rings 50 of radius R1 and two adjustment rings 150 of radius R2 can be obtained, with minimal waste material W3.

Figure 10:
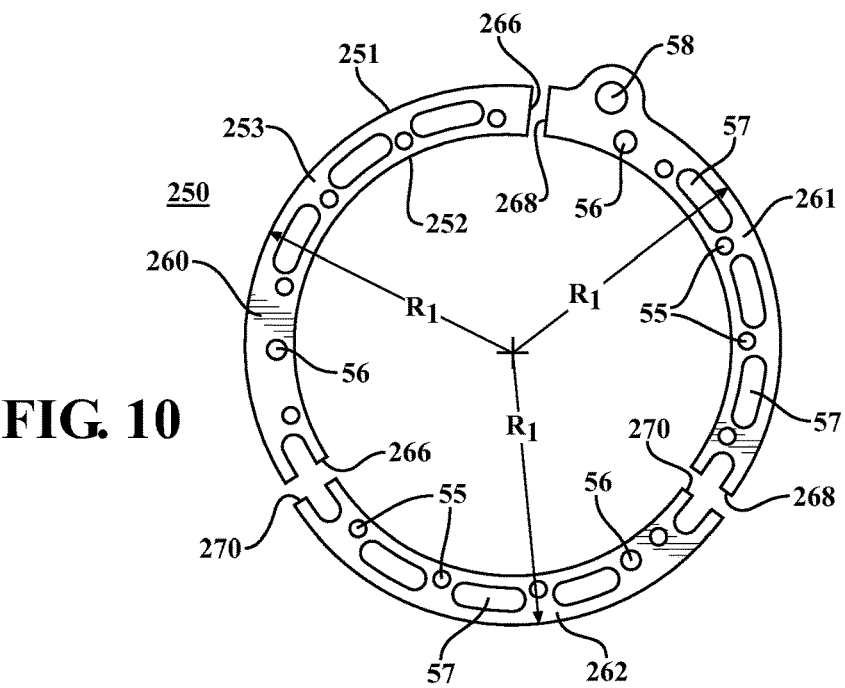
FIG. 10 is a plan view of the ring portions of a three-piece adjustment ring.

Referring to FIG. 10, an alternative embodiment adjustment ring 250 is similar to the adjustment ring 50 illustrated above with respect to FIG. 3 in that it is annular in shape, and includes an outer edge 251, an inner edge 252, and opposed side faces 253, 254 (opposite side face 253, side face 254 not shown) that extend between the outer and inner edges 251, 252, and is formed having three sets of through-openings 55, 56, 57 that extend between the opposed side faces 253, 254. In this embodiment, however, the adjustment ring 250 is an assembly of three pieces, including a first ring portion 260, a second ring portion 261, and a third ring portion 262. The first ring portion 260, the second ring portion 261, and the third ring portion 262 each have a peripheral shape which is an annular sector. In addition, first ring portion 260, the second ring portion 261, and the third ring portion 262 each have the same radius of curvature R1, and an arc length generally corresponding to an angle measure of the sector that is about 120 degrees, so that when assembled together, first ring portion 260, the second ring portion 261, and the third ring portion 262 form a single, complete annular element.

Respective mating edges 266, 268, 270 of first ring portion 260, the second ring portion 261, and the third ring portion 262 are secured together by conventional techniques such as welding, riveting (i.e., orbital riveting), etc., and may also include an irregular, interlocking profile.

Figure 11:
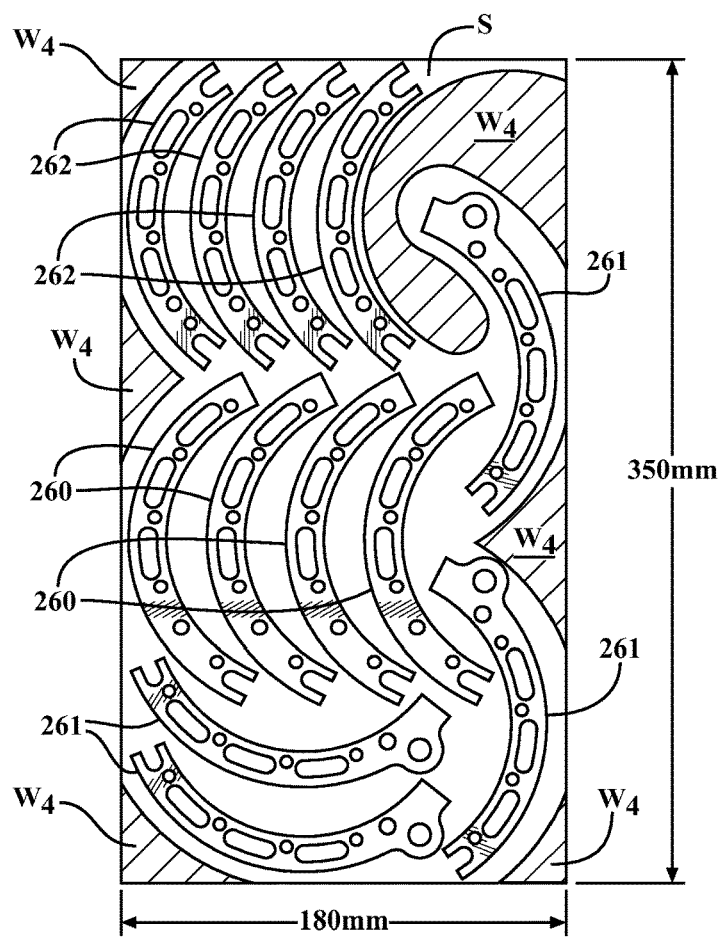
FIG. 11 is an illustration of a cutting pattern for providing ring portions of three-piece adjustment rings, each ring portion having the same radius.

Referring to FIG. 11, by forming the adjustment ring 250 in multiple pieces, in this case three ring portions 260, 261, 262, and then assembling the three ring portions 260, 261, 262 together to form the single, annular element, material costs are reduced. Like the previous embodiment, due to their curved shape and less than-hemispherical arc length, the stamps corresponding to the annular-sector shaped first, second, and third ring portions 260, 261, 262 can be nested. In one example, by using a nested arrangement during stamped cutting of multiple first, second, and third ring portions 260, 261, 262 from the sheet S of source material, four adjustment rings 250 of radius R1 can be obtained, with minimal waste material W4. This can be compared to stamping single-piece annular adjustment rings 500 from the same sheet S of source material, in which only two adjustment rings 500 can be obtained, and in which the amount of resulting waste material W2 of the sheet S (FIG. 8) is much greater than W4.

The adjustment rings 50, 150, 250 illustrated herein have been described as having multiple ring portions 60, 61, 160, 161, 260, 261, 262 formed from a single sheet S of source material, whereby each of the resulting ring portions are formed of the same material, and thus have the same material properties. However, the adjustment rings 50, 150, 250 and the corresponding ring portions ring portions 60, 61, 160, 161, 260, 261, 262 are not limited to this configuration. For example, the ring portions 260, 261, 262 of the adjustment ring 250 may be formed so that at least one ring portion (i.e., the third ring portion 262) has material properties that are different that the material properties of the other ring portions (i.e., the first and second ring portions 260, 261). In some embodiments, the third ring portion 262 is formed of the same material as the material used to form the first and second ring portions 260, 261, but the third ring portion 262 is heat treated, for example to improve wear resistance or other desired material property, whereas the first and second ring portions 260, 261 remain un-heat treated or are subjected to a different heat treatment. In other embodiments, the third ring portion 262 may be formed of a relatively expensive material, such as, for example, a highly wear resistant material such as GMR 235, a high alloy, Nickel-based alloy steel, whereas the first and second ring portions 260, 261 are formed of another material, for example, a conventional material that is less expensive than the material used to form the third ring portion 262, such as 321 stainless steel. In these embodiments, the third ring portion 262 having different material properties, such as for example improved wear resistance, can be assembled into the adjustment ring 250, which in turn is arranged in the turbocharger 1 so that the third ring portion 262 is positioned at a location known to have relatively higher wear. This arrangement allows the use of one ring portion having higher wear properties, while the remaining ring portions are formed of the more cost-effective material and used in non-critical locations. Thus, this arrangement allows the designer to hand pick from materials of varying costs and material properties, and combine them in a single element as required by the specific application. By doing so, material costs can be reduced relative to the configuration in which the adjustment ring is entirely formed of a highly wear resistant material.

Figure 12:
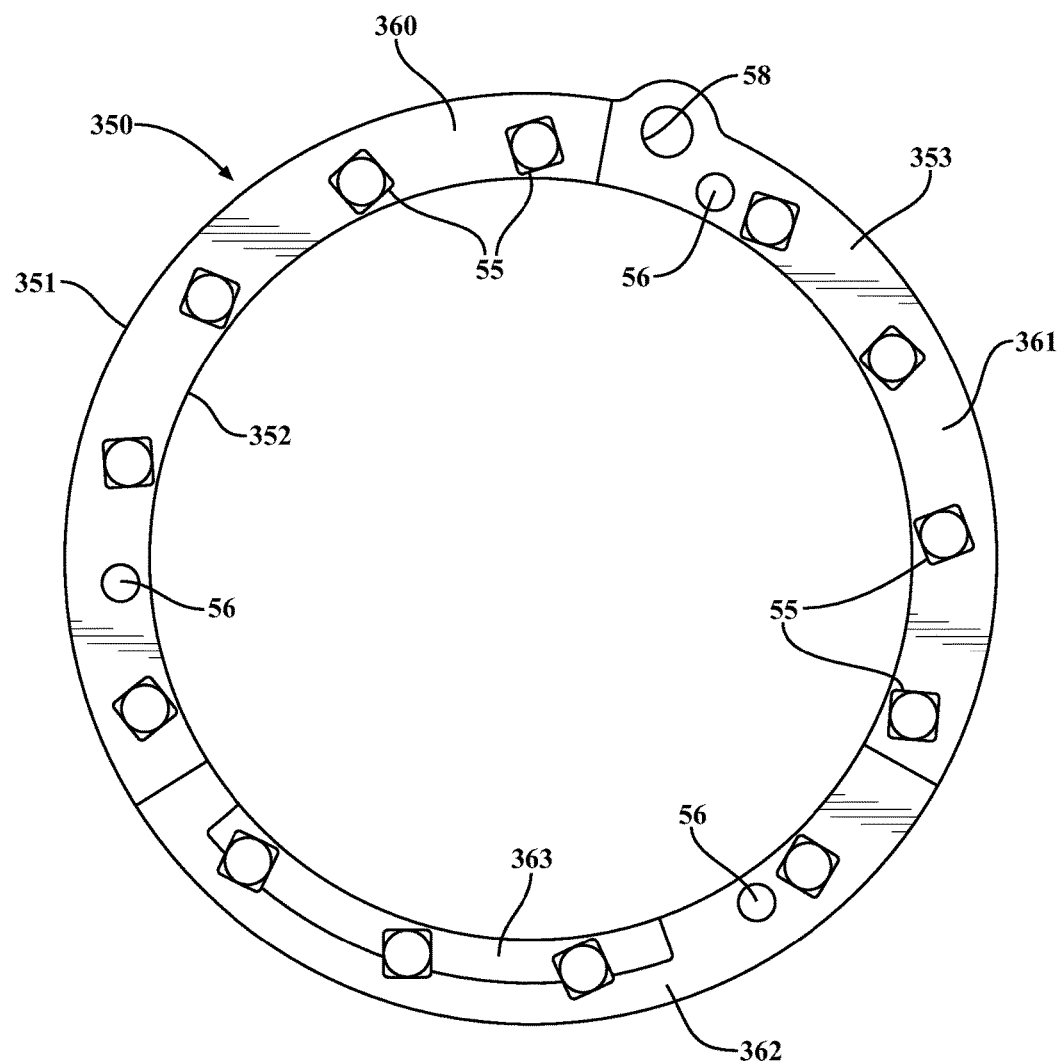
FIG. 12 is a plan view of a four-piece adjustment ring including three ring portions and an insert.

Referring to FIG. 12, another alternative embodiment adjustment ring 350 is annular in shape, and includes an outer edge 351, an inner edge 352, and opposed side faces 353, 354 (opposite side face 353, side face 354 not shown) that extend between the outer and inner edges 351, 352, and is formed having two sets of through-openings 55, 56 that extend between the opposed side faces 353, 354. The adjustment ring 350 also includes a circular securement opening 58, and in some instances, may further include weight reduction openings 57 (not shown). In addition, the adjustment ring 350 is an assembly of four pieces. In particular, the adjustment ring 350 includes a first ring portion 360, a second ring portion 361, and a third ring portion 362, all formed of the same material, for example 321 stainless steel. When assembled together, first ring portion 360, the second ring portion 361, and the third ring portion 362 form a single, annular element. The adjustment ring 350 further includes a fourth piece, e.g., an insert 363, formed of a different material having material properties that address the requirements of a specific application. For example, the insert 363 may be formed of GMR 235 high alloy steel, and may be attached to a side face 353 of the adjustment ring 350 so as to overlie one or more of the first, second and third ring portions 360, 361, 362. The insert 363 may be strategically placed at a location requiring specific material properties, for example, improved wear resistance.

In the illustrated exemplary embodiment, the insert 363 has a peripheral shape which is an annular sector. In addition, the insert 363 has an arc length generally corresponding to the circumferential length of a region of high wear of the adjustment ring 350. For example, the insert 363 may have an arc length that is less than the arc length of the ring portion 362 that it overlies (as shown), or that is the same as or greater than the arc length of the ring portion 362 that it overlies. In addition, the insert 363 has a radial dimension that is less than the radial dimension of the ring portion 362 that it overlies. The insert 363 is secured in the desired position relative to the ring portion 362 via welding, fasteners, adhesives, or a combination thereof. By providing the adjustment ring 350 as an assembly of three stamped ring portions 360, 361, 362, manufacturing costs can be reduced as discussed above. Moreover, by addressing wear resistance requirements by including the insert 363 in the adjustment ring 350, manufacturing costs can be further reduced by minimizing the amount of relatively expensive, high wear material included in the adjustment ring 350, specifically, limiting it to those regions that require this feature.

A method of manufacturing an annular adjustment ring 50, 150, 250, 350 that is configured to facilitate vane position adjustment in a variable turbine geometry turbocharger 1 includes providing an appropriate cutting pattern. The cutting pattern incorporates one or more annular patterns, or portions of annular patterns, where each annular pattern corresponds to a single adjustment ring. In the cutting pattern, each annular pattern is separated into at least two individual sectors corresponding to the ring portions 60, 61. The sectors may include features to provide any required features of the resulting device, for example the throughopenings 55, 56, 57, 58, mating edges with an irregular, mating profile, etc.

The cutting pattern is configured in a way such that the sectors are provided in a nested arrangement. For example, the convex outer edge of a sector corresponding to one ring portion can be arranged within the concave inner edge of a sector corresponding of another ring portion. The nested sectors may correspond to the same ring portion (60, 60 or 61, 61) or may correspond to different ring portions 60, 61.

Multiple adjustment rings 50 are cut from a sheet of source material. Effectively, for each sector, the sheet of source material is cut along the periphery of the each sector used to form a ring portion 60, 61. Once the ring portions 60, 61 are cut from the sheet of source material, one or more adjustment rings 50 are formed by assembling the ring portions 60, 61 together by joining the respective mating edges 66, 68.

In some embodiments, the step of cutting the ring portion 60, 61 from a sheet of source material comprises fine blanking (e.g., fine stamping). Alternatively, other cutting techniques can be used to form the ring portions 60, 61. Multiple ring portions may be cut simultaneously from a single sheet of source material, individual ring portions may be cut sequentially, or cutting may be a combination of both.

In some embodiments, all the ring portions 60, 61 used to form the adjustment ring 50 are formed from the same material. In this case, the step of assembling the ring portions includes assembling connecting the ring portions 60, 61 along their corresponding mating edges 66, 68 to form a homogeneous, annular adjustment ring 50.

In other embodiments, at least one individual ring portion 60 is cut from a first sheet of source material, and at least one other individual ring portion 61 is cut from a second sheet of source material, where the second sheet of source material has different material properties than the first sheet of source material. The different material properties may be inherent to the material used to form the second sheet, or may be provided to the material by heat-treatment, coating, or other process. In some embodiments, the first sheet of source material is formed of the same material as the second sheet of source material, but is heat treated differently than the second sheet of source material.

Where ring portions 60, 61 of differing materials are used, the step of assembling the ring portions 60, 61 includes assembling at least one ring portion (e.g., the first ring portion 60) formed of the first sheet of source material with at least one ring portion (e.g., the second ring portion 61) formed of the second sheet of source material to form a single, annular adjustment ring 50. In some embodiments, the second sheet of source material may be formed of less wear resistant material that that of the first sheet. In this case, the annular adjustment ring 50 is then assembled within the turbocharger 1 such that the first ring portion 60 is arranged within the turbocharger at a location that corresponds to a portion of the adjustment ring 50 that, when in use, is subjected to the highest wear.

Although the adjustment ring 50, 150, 250, 350 are described herein as having two or three ring portions, the adjustment ring is not limited to having two or three ring portions. For example, in some embodiments the adjustment ring 50, 150, 250, 350 may have four or more ring portions.

Although the adjustment ring 50, 150, 250, 350 are described herein as having multiple ring portions 60, 61, 62, each ring portion 60, 61, 62 having an approximately equal circumferential dimension, the adjustment ring 50, 150, 250, 350 is not limited to this configuration. For example, in some embodiments, one of the ring portions (e.g., the first ring portion 60) may be larger or smaller than the other ring portions used to form the adjustment ring 50, 150, 250, 350. In some embodiments, each ring portion 60, 61, 62 may have a unique circumferential dimension.

Although the adjustment ring 50, 150, 250, 350 is described herein as being formed of 321 stainless steel, GMR 235 alloy steel, or a combination thereof, these materials are exemplary and the adjustment ring 50, 150, 250, 350 are not limited to these materials or a combination thereof. Materials selected to form the adjustment ring 50, 150, 250, 350 will be determined by the requirements of the specific application.

Although the adjusting ring 50 is described herein as being constrained and supported by the axial and radial shapes fabricated on the ramparts 38 of the vane arms 36, it is not limited to this configuration. For example, in some embodiments, the adjusting ring 50 may be radially supported and constrained by a set of rollers (not shown) which are themselves either constrained by the turbine housing or upper vane ring 40. In this configuration, the vane arms 36 are flat and do not contain the ramparts of the illustrated embodiment.

Aspects described herein can be embodied in other forms and combinations without departing from the spirit or essential attributes thereof. Thus, it will of course be understood that embodiments are not limited to the specific details described herein, which are given by way of example only, and that various modifications and alterations are possible within the scope of the following claims.

What is claimed, is:

1. An adjustment ring (50) configured to facilitate vane (30) position adjustment in a variable turbine geometry turbocharger (1), the adjustment ring (50) comprising
   a first ring portion (60) that is formed of a first material; and
   a second ring portion (61) that is formed of a second material,
   wherein the first ring portion (60) and the second ring portion (61) are configured to be assembled together into a single annular element, and
      the first material has different material properties than the second material.

2. The adjustment ring (50) of claim 1, wherein the first material is a different material than the second material.

3. The adjustment ring (50) of claim 1, wherein the first material has been subjected to a different heat treatment than the second material.

4. The adjustment ring (50) of claim 1, wherein the first material has a higher wear resistance than the second material.

5. The adjustment ring (50) of claim 4, wherein the first ring portion (60) corresponds to a portion of the single annular element that, when in use, is subjected to the highest wear.

6. The adjustment ring (50) of claim 1, wherein the first ring portion (60) is fixed to the second ring portion (61).

7. The adjustment ring (50) of claim 6, wherein the first ring portion (60) includes a first ring mating edge (66) having an irregular profile, the second ring portion (61) includes a second ring mating edge (68) having an irregular profile, and the irregular profile of the first ring mating edge (66) is configured to matingly engage the irregular profile of the second ring mating edge (68).

8. A method of manufacturing an annular adjustment ring (50) configured to facilitate vane (30) position adjustment in a variable turbine geometry turbocharger (1), the method of manufacturing comprising providing a cutting pattern for the adjustment ring (50), the cutting pattern incorporating sector patterns, each sector pattern corresponding to a ring portion (60, 61) of the adjustment ring (50), the sector patterns arranged within the cutting pattern such that the sector patterns are nested;

cutting a first sheet of source material in accordance with the cutting pattern to provide ring portions (60, 61);

cutting at least one individual ring portion (60) from a second sheet of source material, where the second sheet of source material has different material properties than the first sheet of source material; and assembling at least one of the ring portions (60, 61) and the at least on individual ring portion together to form at least one annular adjustment ring (50).

9. The method of claim 8, wherein the step of cutting comprises fine blanking.

10. The method of claim 8, wherein the first sheet of source material has different wear resistance than the second sheet of source material.

11. The method of claim 8, wherein the second sheet of source material is less wear resistant than the first sheet of source material, and when the ring portions (60, 61) are assembled together to form the adjustment ring (50), the first ring portion (60) is arranged within the adjustment ring (50) at a location that corresponds to a portion of the adjustment ring (50) that, when in use, is subjected to the highest wear.

\* \* \* \* \*